US009596163B1

(12) United States Patent
Trinh

(10) Patent No.: US 9,596,163 B1
(45) Date of Patent: Mar. 14, 2017

(54) RESTART A FORCE STOP MOBILE APPLICATION

(71) Applicant: Symantec Corporation, Mountain View, CA (US)

(72) Inventor: Charles Trinh, Anaheim, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/850,630

(22) Filed: Sep. 10, 2015

(51) Int. Cl.
*H04W 36/00* (2009.01)
*H04L 12/26* (2006.01)
*H04M 3/22* (2006.01)

(52) U.S. Cl.
CPC .............. *H04L 43/10* (2013.01); *H04M 3/22* (2013.01)

(58) Field of Classification Search
CPC ........ G06F 8/61; G06F 9/445; G06F 11/3466; G04L 63/08; H04L 63/10; A63F 13/79; G06Q 30/0226; H04W 68/02; H04W 8/22
USPC ......... 455/425; 709/224, 203, 201; 711/174, 711/170; 380/259
See application file for complete search history.

(56) References Cited

U.S. PATENT DOCUMENTS

2016/0077819 A1* 3/2016 Xin ................ G06F 8/61 717/174

OTHER PUBLICATIONS http://stackoverflow.com/questions/21452123/how-to-restart-service-after-force-stop-of-app.
http://blog.scriptico.com/01/how-to-restart-android-application/.
http://stackoverflow.com/questions/4399611/force-iphone-app-to-restart-programmatically.

* cited by examiner

Primary Examiner — Phuoc H Doan
(74) Attorney, Agent, or Firm — Holland & Hart LLP

(57) ABSTRACT

A method for restarting a force stop mobile application is described. In one embodiment, the method may include establishing a connection with a first application installed on a mobile device and receiving a heartbeat signal from the first application via the established connection. Upon receiving the heartbeat signal, the method may include monitoring for subsequent heartbeat signals from the first application and determining a subsequent heartbeat from the first application is not received when expected. Upon determining the subsequent heartbeat from the first application is not received when expected, the method may include determining whether a second application related to the first application is running on the mobile device.

20 Claims, 6 Drawing Sheets

RESTART A FORCE STOP MOBILE APPLICATION

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of and continued advancements in mobile computing device security products and systems. For example, advancements in mobile devices allow users to monitor an aspect of a mobile device from anywhere in the world. Nevertheless, benefits may be realized by providing systems and methods for improving the security of mobile computing devices.

SUMMARY

According to at least one embodiment, a method for restarting a force stop mobile application is described. In one embodiment, the method may include establishing a connection with a first application installed on a mobile device and receiving a heartbeat signal from the first application via the established connection. Upon receiving the heartbeat signal, the method may include monitoring for subsequent heartbeat signals from the first application and determining a subsequent heartbeat from the first application is not received when expected. Upon determining the subsequent heartbeat from the first application is not received when expected, the method may include determining whether a second application related to the first application is running on the mobile device.

In some embodiments, upon determining the second application is running on the mobile device and that the subsequent heartbeat is not received from the first application when expected, the method may include sending a message to the second application, the message instructing the second application to restart the first application. In some cases, the method may include receiving a response from the second application indicating the first application is not installed on the mobile device and upon receiving a response from the second application indicating the first application is not installed on the mobile device, sending a notification to the mobile device. In some embodiments, the notification may indicate the first application is removed and requesting confirmation the first application was removed intentionally.

In one embodiment, upon determining the second application is not running on the mobile device, the method may include sending a notification to the mobile device, the notification indicating the first application may be stopped and requesting a manual restart of the first application. In some embodiments, the first and second applications provide a form of protection to the mobile device. In some cases, a background service of the first application sends the heartbeat signal via the established connection. In one embodiment, a backend server establishes a first connection with the first application, the backend server receiving the heartbeat signal from the first application via the first connection. Additionally, or alternatively, the second application establishes a second connection with the first application, the second application receiving the heartbeat signal from the first application via the second connection. In some embodiments, the second application sends a heartbeat signal to the backend server.

A computing device configured for restarting a force stop mobile application is also described. The computing device may include a processor and memory in electronic communication with the processor. The memory may store computer executable instructions that when executed by the processor cause the processor to perform the steps of establishing a connection with a first application installed on a mobile device and receiving a heartbeat signal from the first application via the established connection. Upon receiving the heartbeat signal, the processor may perform the steps of monitoring for subsequent heartbeat signals from the first application and determining a subsequent heartbeat from the first application is not received when expected. Upon determining the subsequent heartbeat from the first application is not received when expected, the processor may perform the steps of determining whether a second application related to the first application is running on the mobile device.

A non-transitory computer-readable storage medium storing computer executable instructions is also described. When the instructions are executed by a processor, the execution of the instructions may cause the processor to perform the steps of establishing a connection with a first application installed on a mobile device and receiving a heartbeat signal from the first application via the established connection. Upon receiving the heartbeat signal, the processor may perform the steps of monitoring for subsequent heartbeat signals from the first application and determining a subsequent heartbeat from the first application is not received when expected. Upon determining the subsequent heartbeat from the first application is not received when expected, the processor may perform the steps of determining whether a second application related to the first application is running on the mobile device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
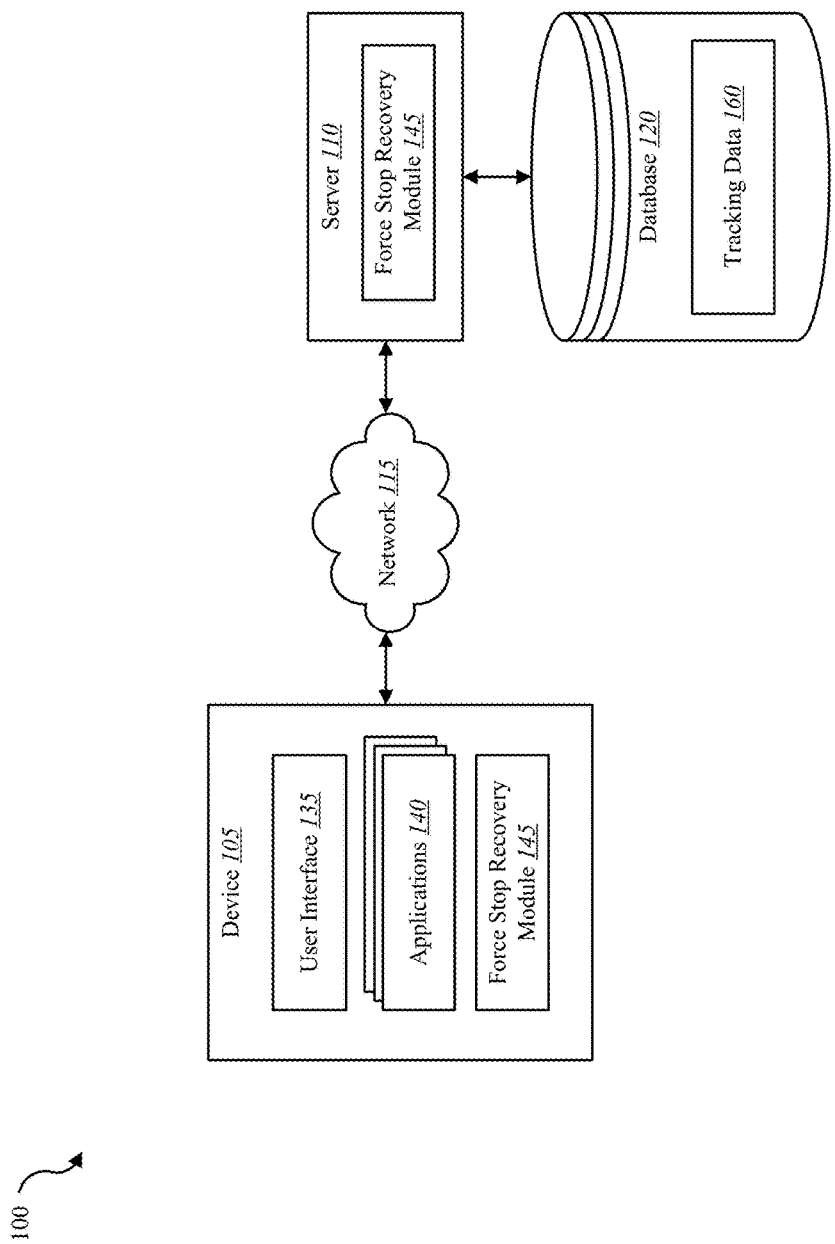
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to recovering a force stop mobile application. More specifically, the systems and methods described herein relate to monitoring a mobile application, detecting when the mobile application is shut down, and restarting the mobile application.

Mobile applications such as NORTON® Mobile Security and NORTON® Family may provide a user interface while running services in the background to monitor and protect user data and activities. When these services are stopped, user data and activities are no longer protected. In some cases, after being force stopped, some mobile applications do not restart by themselves, even after the mobile device is rebooted. Thus, in one embodiment, when an application is force stopped, the force stopped application may be restarted programmatically by a second application or manually by a user.

In one embodiment, a mobile application may generate heartbeats to indicate they are alive. The heartbeats of a first mobile application may be monitored by a second mobile application running on the same device and/or by a backend service. When the first mobile application's heartbeat is stopped, the backend service and/or second application may detect the stop and restart the mobile application.

In one embodiment, a user installs at least a first mobile application and in some cases a second mobile application on a mobile device. The mobile applications have services running in the background to generate and send heartbeat messages to a backend server and/or from one application to another in order to indicate that the mobile applications are running and in good state. In some cases, the heartbeat may include information regarding the mobile application sending the heartbeat such as an application identifier, etc. In some embodiments, the backend server keeps track of the heartbeat messages received from the first and/or second mobile application to verify they are running. In some cases, the second mobile application keeps track of the heartbeat messages received from the first mobile application. When the heartbeat message from a particular application has not been received in an expected period of time, the backend service may determine whether a second mobile application associated with the first mobile application is running on the same device. For example, if the first mobile application is a NORTON® mobile application, the backend service may determine whether there is another NORTON® mobile application running on the mobile device. If the second mobile application is running (i.e., the backend service detects a heartbeat from the second mobile application, for example), the backend service may send a message to the second mobile application to restart the target mobile application (e.g., first mobile application). In some cases, the second mobile application may check to see if the first mobile application is installed. If the first mobile application is no longer installed, the second mobile application may send a notification to the backend service indicating the first mobile application is no longer installed. In some cases, the backend service may send a message to the mobile device (e.g., email, text message, toast message, pop-up notification, etc.) indicating the first mobile application is uninstalled and requesting a user confirm the uninstallation was intentional. If the user confirms the first mobile application was uninstalled intentionally, the backend service may remove the first mobile application from a list of monitored mobile applications. On the other hand, if the second mobile application discovers the first mobile application is installed but not running, the second mobile application may restart the first mobile application and/or schedule the first mobile application to be restarted at later time.

In one embodiment, if the backend service discovers the first mobile application is not running and that the second mobile application is either not running or not installed, then backend service may send a message to the mobile device to notify a user the first mobile application is not running and provide in the notification a link to restart the first mobile application manually.

In some embodiments, a second mobile application may monitor the first mobile application. Thus, the second mobile application may detect when the first mobile application is shut down and upon detecting the shutdown, may programmatically restart the first mobile application without user intervention or knowledge. In some cases, the first mobile application may monitor the second mobile application, the second mobile application may monitor the first mobile application, and the backend service may monitor both the first and second mobile applications.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, and a network 115 that allows the device 105 and the server 110 to communicate with one another.

Examples of the device 105 may include any combination of mobile devices, smart phones, personal computing devices, computers, laptops, desktops, servers, media content set top boxes, satellite set top boxes, cable set top boxes, etc. Examples of server 110 may include any combination of a data server, a cloud server, a server associated with an automation service provider, proxy server, mail server, web server, application server, database server, communications server, file server, home server, mobile server, name server, etc.

In some configurations, the device 105 may include a user interface 135, one or more applications 140, and force stop recovery module 145. The user interface 135 may enable a user of device 105 to interface with the one or more applications 140, network 115, server 110, and/or one or more functions and/or components of force stop recovery module 145. Although the components of the device 105 are depicted as being internal to the device 105, it is understood that one or more of the components may be external to the device 105 and connect to device 105 through wired and/or wireless connections.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a force stop recovery module 145. For example, device 105 may include one or more applications 140 that allows device 105 to interface with another computing device such as server 110. In some embodiments, device 105 and server 110 may include a force stop recovery module 145 where at least a portion of the functions of force stop recovery module 145 are performed separately and/or concurrently on device 105 and/or server 110. Thus, in some embodiments, functions of device 105 (directly or through device 105 via force stop recovery module 145) may be accessed from server 110 and/or vice versa.

In some embodiments, server 110 may be coupled to database 120. Database 120 may be internal or external to the server 110. In one example, device 105 may be coupled directly to database 120, database 120 being internal or external to device 105. Database 120 may include tracking data 160. Tracking data 160 may include information regarding one or more applications being tracked by device 105 and/or server 110 in conjunction with force stop recovery module 145. In some cases, device 105 may access tracking data 160 in database 120 over network 115 via server 110.

Force stop recovery module 145 may enable device 105 and/or server 110 to monitor one or more mobile applications (e.g., applications 140), detect when a mobile application is shut down, and restart the application. In some embodiments, force stop recovery module 145 may be configured to perform the systems and methods described herein in conjunction with user interface 135 and the one or more applications 140. Further details regarding the force stop recovery module 145 are discussed below.

Figure 2:
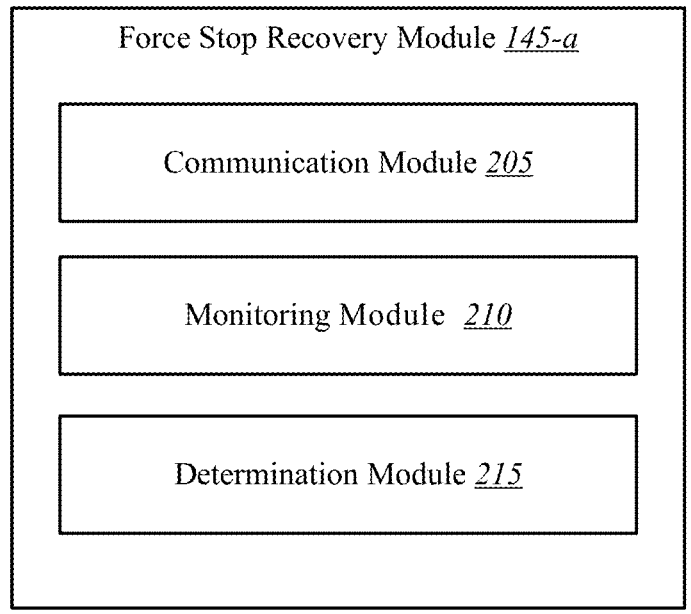
FIG. 2 is a block diagram illustrating one example of a force stop recovery module.

FIG. 2 is a block diagram illustrating one example of a force stop recovery module 145-*a*. Force stop recovery module 145-*a* may be one example of force stop recovery module 145 depicted in FIG. 1. As depicted, force stop recovery module 145-*a* may include communication module 205, monitoring module 210, and determination module 215.

In one embodiment, communication module 205 may establish a first connection with a first application installed on a mobile device (e.g., application 140 on device 105 of FIG. 1). In some configurations, communication module 205 may establish a second connection with a second application installed on a mobile device. The possible states of first and second mobile applications may include being installed and running, being installed and not running (e.g., shut down or force stopped, etc.), and not installed. In some cases, the first mobile application may be related to the second mobile application. For example, both applications may provide a form of protection to a mobile device. The forms of protection may include malware protection, parental control software, identify protection software, data security software, data encryption software, data security application, secure communication application, cloud software, etc. For example, the first application may include malware protection software and the second application may include parental control software. In some cases, the first and second applications may be developed by the same entity such as a company, etc. In some cases, the first and second applications may come from the same or similar line of software from the entity. Thus, in some embodiments, the first and/or second applications provide a form of protection to the mobile device. In some cases, at least one of the first and second mobile applications may include a user interface (e.g., user interface 135 of FIG. 1). The mobile application may include a background service that a user does not interface with as well as a security function that interface with a user.

In some cases, communication module 205 may receive a heartbeat signal from the first and/or second application via the respective established connections. In some cases, a background service of the first and/or second applications sends a heartbeat signal via the respective established connections. In some embodiments, a backend server (e.g., server 110) establishes the first connection with the first application and/or establishes the second connection with the second application. In some embodiments, the second application, in conjunction with communication module 205, may establish an application-to-application connection with the first application. Thus, in some cases, the second application may receive a heartbeat signal from the first application via the application-to-application connection.

Upon receiving the heartbeat signal, monitoring module 210 may monitor for subsequent heartbeat signals from the first application and/or second application. In some embodiments, determination module 215 may determine a subsequent heartbeat from the first application is not received when expected. As one example, the first application may send a heartbeat every two minutes via the first connection and/or application-to-application connection. When the heartbeat is not received within the two minute time period and/or within some predetermined extension beyond the expected time period (e.g., a 30 second extension for a total of two minutes and 30 seconds, as one example), determination module 215 may determine the heartbeat is not received when expected.

Upon determining the subsequent heartbeat from the first application is not received when expected, determination module 215 may determine whether the second application is currently running on the mobile device. Accordingly, upon determining the second application is running on the mobile device and that the subsequent heartbeat is not received from the first application when expected, communication module 205 may send a message to the second application. In some cases, the message may instruct the second application to restart the first application. For example, upon receiving the message, the second application may execute one or more instructions to programmatically restart the first application.

In one embodiment, communication module 205 may receive a response from the second application indicating the first application is not installed on the mobile device. For example, the first application may be removed from the mobile device. Thus, upon receiving a response from the second application indicating the first application is not installed on the mobile device, communication module 205 may send a notification to mobile device. In some cases, the notification may indicate the first application is removed and may request confirmation the first application was removed intentionally. For example, malicious software may shutdown and/or remove the first application without a user's knowledge. In some embodiments, upon determining the second application is not running on the mobile device, communication module 205 may send a notification to the mobile device. For example, the communication module 205 may send an email, a text message, a voicemail, etc., to the mobile device. Additionally, or alternatively, the communication module 205 may generate and display, in conjunction with a notification service of an operating system installed on the mobile device, a toast message or pop-up notification on the mobile device. In some cases, the notification may indicate the first application is stopped and may request a manual restart of the first application. Thus, in some cases, the communication module 205 may request a user of the mobile device to manually restart the first application.

Figure 3:
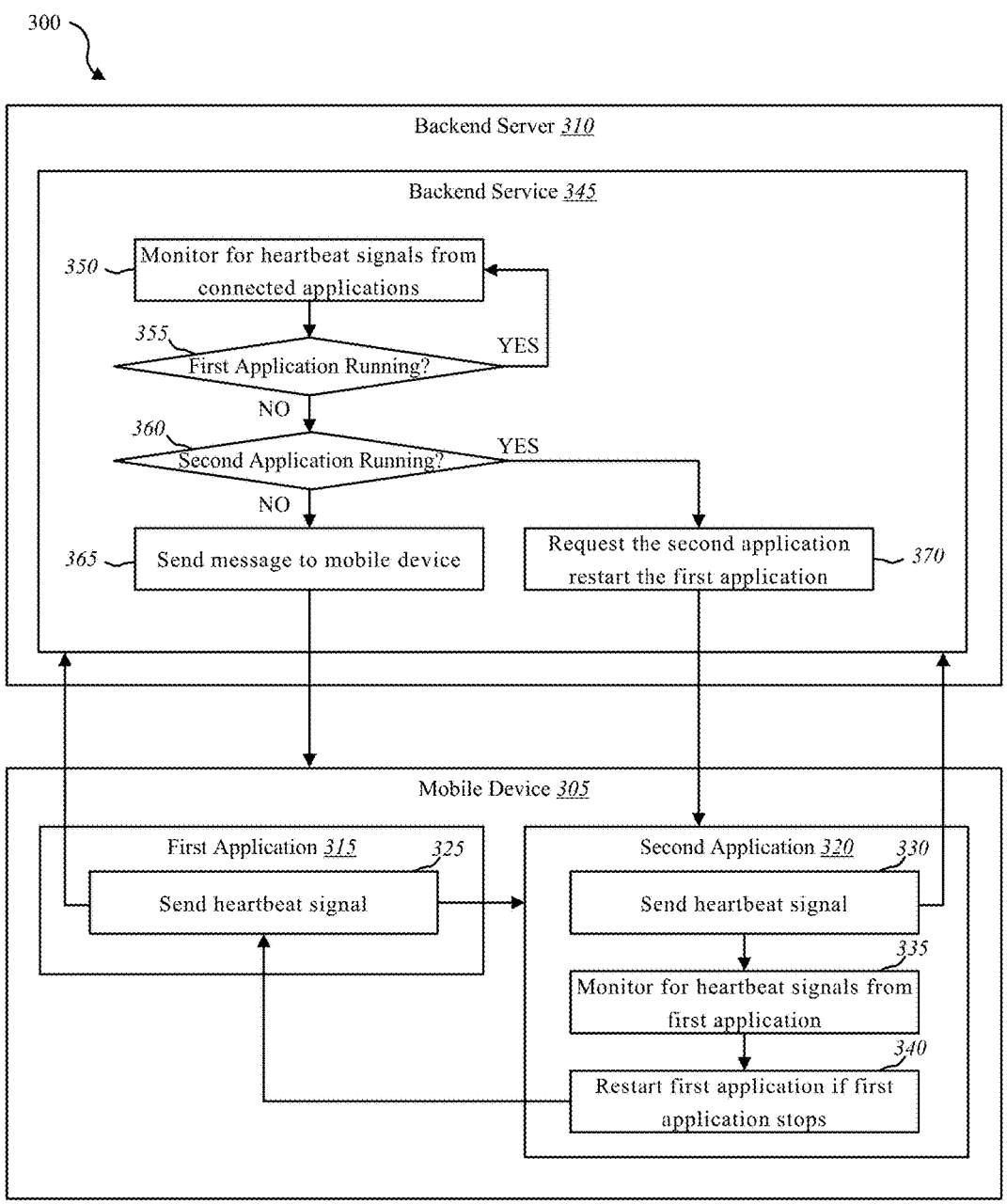
FIG. 3 is a block diagram illustrating one example of an environment for restarting a force stop mobile application.

FIG. 3 is a block diagram illustrating one example of an environment 300 for restarting a force stop mobile application. As depicted, the environment 300 may include a mobile device 305 and a backend server 310. Mobile device 305 and backend server 310 may be one example, respectively, of device 105 and server 110 of FIG. 1. In some cases, the mobile device 305 and backend server 310 may communicate with each other via a wired and/or wireless connection (e.g., network 115 of FIG. 1).

In one embodiment, mobile device 305 may include a first application 315 and a second application 320. Backend server 310 may include a backend service 345. At block 325, first application 315 may be configured to send a heartbeat signal to backend service 345 and/or second application 320. Likewise, at block 330, second application 320 may send a heartbeat signal to backend service 345. In some cases, at block 335, second application 320 may monitor for heartbeat signals from first application 315. At block 340, if second application 320 detects first application 315 stops, second application 320 may restart first application 315.

In some embodiments, backend service 345 may establish connections with and receive heartbeat signals from first application 315 and/or second application 320. Accordingly, at block 350, backend service 345 may monitor for heartbeat signals from first and/or second applications 315 and 320. At block 355, backend service 345 may determine whether the first application 315 is running. For example, backend service 345 may determine whether a heartbeat signal from first application 315 was received as expected within a predetermined time period. If backend service 345 determines the first application 315 is running, the backend service continues monitoring at block 350. On the other hand, if backend service 345 determines the first application 315 is not running, at block 360, the backend service 345 may determine whether the second application 320 is running. If backend service 345 determines the second application 315 is running, at block 370, the backend service may request the second application 320 restart the first application 315. Accordingly, at block 340, the second application 320 restarts the first application 315. On the other hand, if backend service 345 determines the second application 320 is not running, at block 366, the backend service 345 may send a message to the mobile device indicating the first and/or second applications 315 and 320 are not running and requesting a user manually restart the first and/or second applications 315 and 320.

Figure 4:
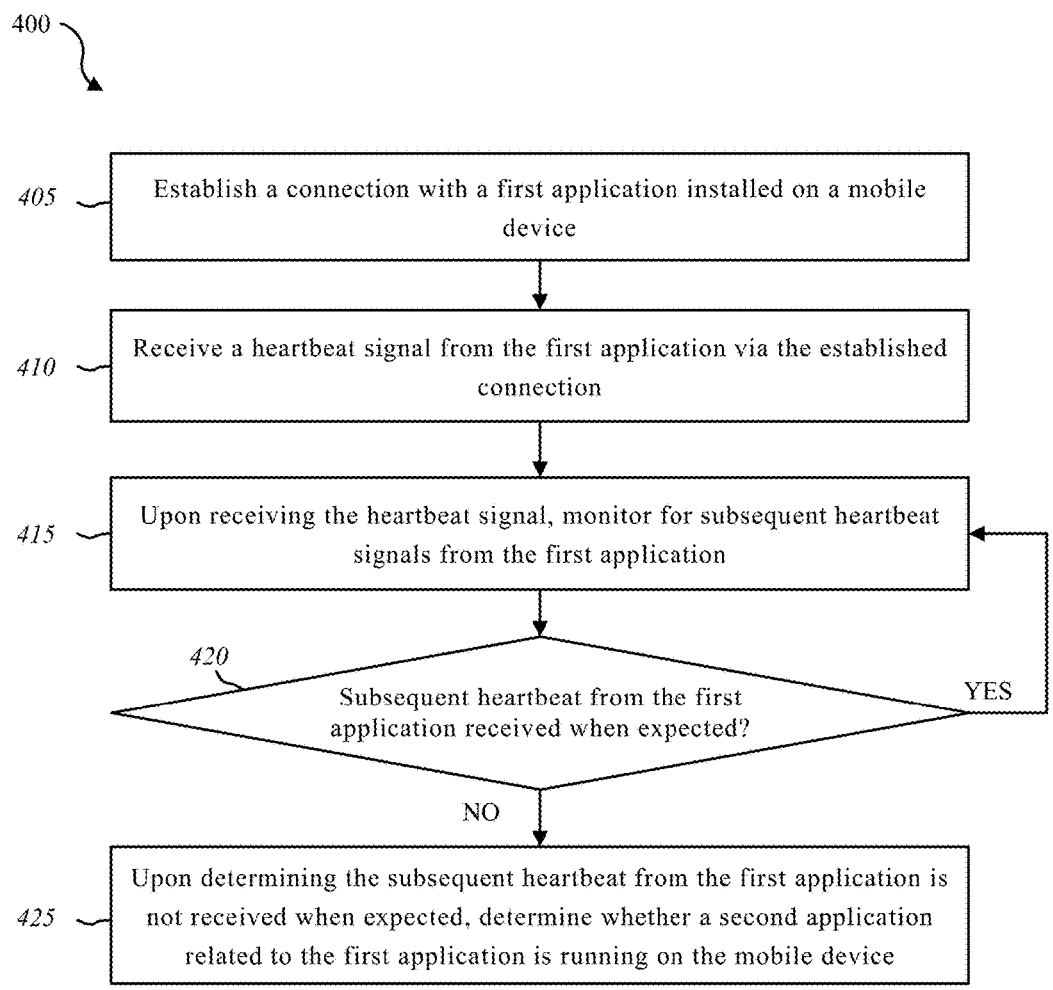
FIG. 4 is a flow diagram illustrating one embodiment of a method for restarting a force stop mobile application.

FIG. 4 is a flow diagram illustrating one embodiment of a method 400 for restarting a force stop mobile application. In some configurations, the method 400 may be implemented by the force stop recovery module 145 illustrated in FIGS. 1 and/or 2. In some configurations, the method 400 may be implemented in conjunction with the one or more applications 140 and/or the user interface 135 illustrated in FIG. 1.

At block 405, the method 400 may include establishing a connection with a first application installed on a mobile device. At block 410, the method 400 may include receiving a heartbeat signal from the first application via the established connection. At block 415, upon receiving the heartbeat signal, the method 400 may include monitoring for subsequent heartbeat signals from the first application. At block 420, the method 400 may include determining whether a subsequent heartbeat from the first application is not received when expected. If the subsequent heartbeat is received, then the monitoring continues at block 415. However, upon determining the subsequent heartbeat from the first application is not received when expected, at block 425 the method 400 may include determining whether a second application related to the first application is running on the mobile device.

Figure 5:
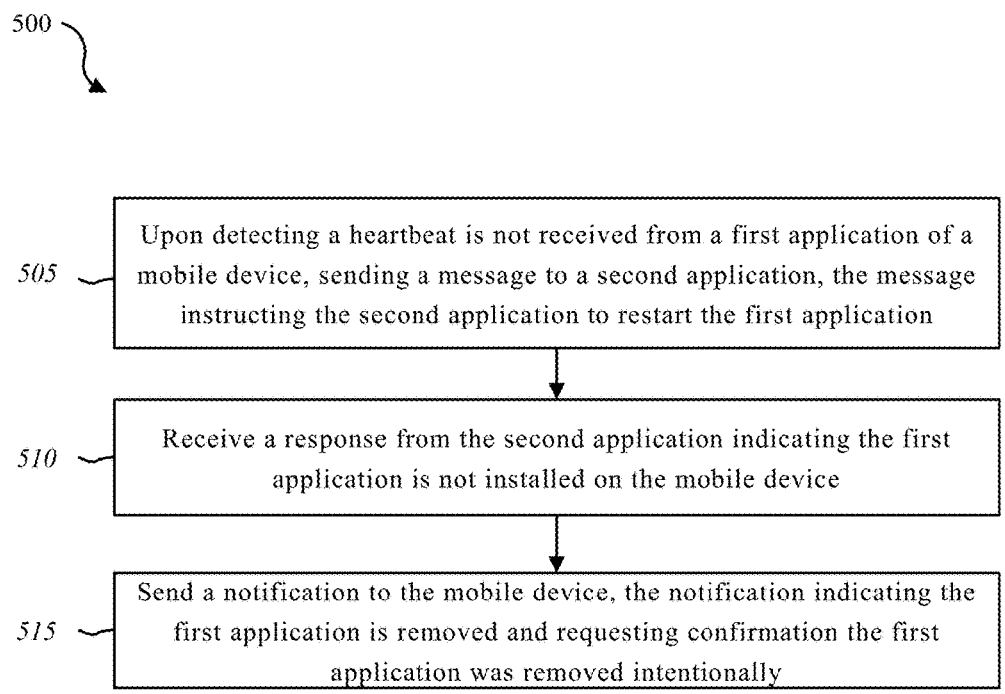
FIG. 5 is a flow diagram illustrating one embodiment of a method for restarting a force stop mobile application.

FIG. 5 is a flow diagram illustrating one embodiment of a method 500 for restarting a force stop mobile application. In some configurations, the method 500 may be implemented by the force stop recovery module 145 illustrated in FIG. 1 or 2. In some configurations, the method 500 may be implemented in conjunction with the one or more applications 140 and/or the user interface 135 illustrated in FIG. 1.

The method 500 may include monitoring a first application for a heartbeat. If a heartbeat is received, the monitoring may continue. If the heartbeat is not received as expected, at block 505, the method 500 may include sending a message to a second application on the mobile device. The message may instruct the second application to restart the first application. If the first application is installed, the second application may programmatically restart the first application. At block 510, the method may include receiving a response from the second application indicating the first application is not installed on the mobile device. At block 515, upon receiving a response from the second application indicating the first application is not installed on the mobile device, the method 500 may include sending a notification to mobile device. In some cases, the notification may indicate the first application is removed and may request confirmation the first application was removed intentionally. For example, the notification may include a notification displayed on the mobile device prompting a user to confirm the first application was removed intentionally.

Figure 6:
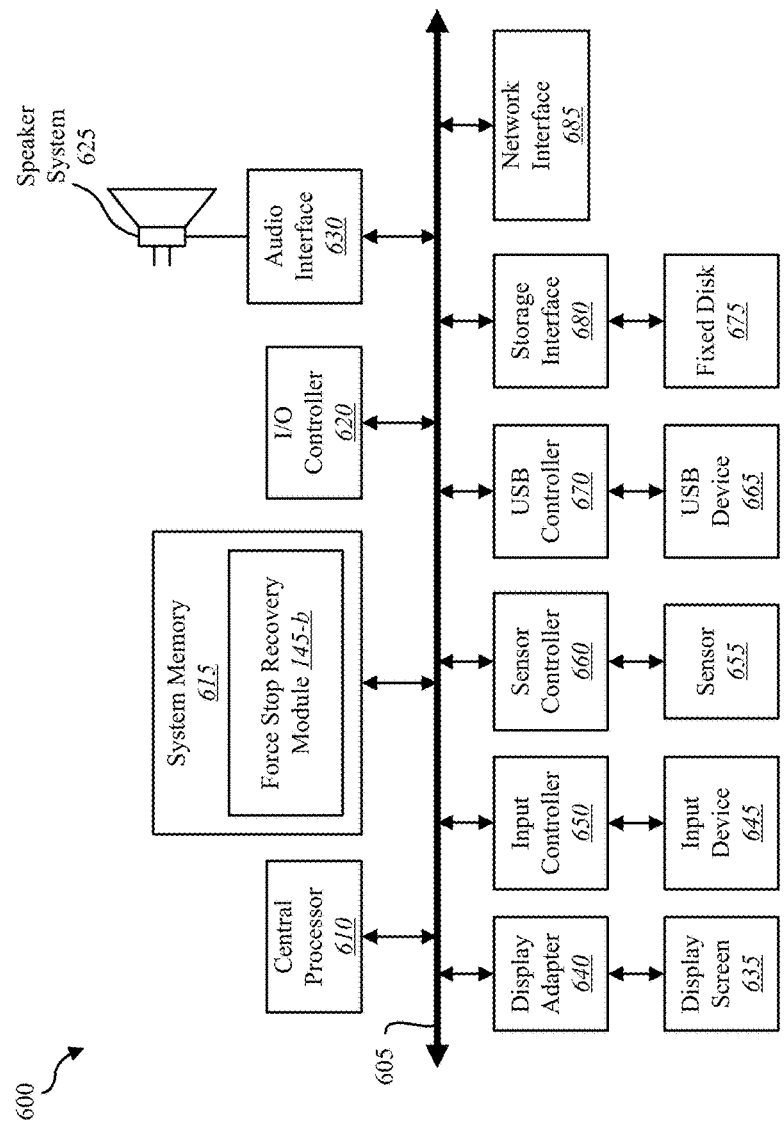
FIG. 6 depicts a block diagram of a computer system suitable for implementing the present systems and methods.

FIG. 6 depicts a block diagram of a computing device 600 suitable for implementing the present systems and methods. The device 600 may be an example of device 105 and/or server 110 illustrated in FIG. 1. In one configuration, device 600 includes a bus 605 which interconnects major subsystems of device 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the force stop recovery module 145-b to implement the present systems and methods may be stored within the system memory 615. Applications (e.g., the one or more applications 140) resident with device 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of device 600, can connect to a standard computer readable medium for storage and/or retrieval of information, such as a fixed disk drive 675. Fixed disk drive 675 may be a part of device 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on device 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for restarting a force stop mobile application, comprising:

establishing, by a processor, a connection with a first application installed on a mobile device;

receiving, by the processor, a heartbeat signal from the first application via the established connection;

upon receiving the heartbeat signal, monitoring, by the processor, for subsequent heartbeat signals from the first application;

determining, by the processor, a subsequent heartbeat from the first application is not received when expected; and upon determining the subsequent heartbeat from the first application is not received when expected, determining, by the processor, whether a second application related to the first application is running on the mobile device.

2. The method of claim 1, comprising:
upon determining the second application is running on the mobile device and that the subsequent heartbeat is not received from the first application when expected, sending, by the processor, a message to the second application, the message instructing the second application to restart the first application.

3. The method of claim 2, comprising:
receiving, by the processor, a response from the second application indicating the first application is not installed on the mobile device.

4. The method of claim 3, comprising:
upon receiving a response from the second application indicating the first application is not installed on the mobile device, sending, by the processor, a notification to the mobile device, the notification indicating the first application is removed and requesting confirmation the first application was removed intentionally.

5. The method of claim 1, comprising:
upon determining the second application is not running on the mobile device, sending, by the processor, a notification to the mobile device, the notification indicating the first application may be stopped and requesting a manual restart of the first application.

6. The method of claim 1, wherein the first application and the second application provide a form of protection to the mobile device.

7. The method of claim 1, wherein a background service of the first application sends the heartbeat signal via the established connection.

8. The method of claim 1, wherein a backend server, in conjunction with the processor, establishes a first connection with the first application, the backend server receiving the heartbeat signal from the first application via the first connection.

9. The method of claim 1, wherein the second application, in conjunction with the processor, establishes a second connection with the first application, the second application receiving the heartbeat signal from the first application via the second connection.

10. The method of claim 1, wherein the second application sends a heartbeat signal to a backend server.

11. A computing device configured for restarting a force stop mobile application, comprising:
a processor;
memory in electronic communication with the processor;
instructions stored in the memory, the instructions being executable by the processor to perform the steps of:
establishing a connection with a first application installed on a mobile device;
receiving a heartbeat signal from the first application via the established connection;
upon receiving the heartbeat signal, monitoring for subsequent heartbeat signals from the first application;
determining a subsequent heartbeat from the first application is not received when expected; and
upon determining the subsequent heartbeat from the first application is not received when expected, determining whether a second application related to the first application is running on the mobile device.

12. The computing device of claim 11, wherein the instructions are executable by the processor to:
upon determining the second application is running on the mobile device and that the subsequent heartbeat is not received from the first application when expected, sending a message to the second application, the message instructing the second application to restart the first application.

13. The computing device of claim 12, wherein the instructions are executable by the processor to:
receiving a response from the second application indicating the first application is not installed on the mobile device.

14. The computing device of claim 13, wherein the instructions are executable by the processor to:
upon receiving a response from the second application indicating the first application is not installed on the mobile device, sending a notification to the mobile device, the notification indicating the first application is removed and requesting confirmation the first application was removed intentionally.

15. The computing device of claim 11, wherein the instructions are executable by the processor to:
upon determining the second application is not running on the mobile device, sending a notification to the mobile device, the notification indicating the first application may be stopped and requesting a manual restart of the first application.

16. The computing device of claim 11, wherein the first application and the second application provide a form of protection to the mobile device.

17. The computing device of claim 11, wherein a background service of the first application sends the heartbeat signal via the established connection.

18. The computing device of claim 11, wherein a backend server establishes a first connection with the first application, the backend server receiving the heartbeat signal from the first application via the first connection, and wherein the second application establishes a second connection with the first application, the second application receiving the heartbeat signal from the first application via the second connection.

19. A computer-program product for restarting a force stop mobile application, the computer-program product comprising a non-transitory computer-readable medium storing instructions thereon, the instructions being executable by a processor to perform the steps of:
establishing a connection with a first application installed on a mobile device;
receiving a heartbeat signal from the first application via the established connection;
upon receiving the heartbeat signal, monitoring for subsequent heartbeat signals from the first application;
determining a subsequent heartbeat from the first application is not received when expected; and
upon determining the subsequent heartbeat from the first application is not received when expected, determining whether a second application related to the first application is running on the mobile device.

20. The computer-program product of claim 19, wherein the instructions are executable by the processor to:
upon determining the second application is running on the mobile device and that the subsequent heartbeat is not received from the first application when expected, sending a message to the second application, the message instructing the second application to restart the first application.

* * * * *